US010945108B2

(12) United States Patent
Rasmusson et al.

(10) Patent No.: US 10,945,108 B2
(45) Date of Patent: Mar. 9, 2021

(54) RELOCATION OF MOBILE EDGE APPLICATIONS

(71) Applicant: Sony Mobile Communications Inc., Tokyo (JP)

(72) Inventors: Jim Rasmusson, Vellinge (SE); Anders Isberg, Åkarp (SE); Linh Trang, Aakarp (SE); Svante Alnås, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/340,036

(22) PCT Filed: Oct. 14, 2016

(86) PCT No.: PCT/EP2016/074713
§ 371 (c)(1),
(2) Date: Apr. 5, 2019

(87) PCT Pub. No.: WO2018/068863
PCT Pub. Date: Apr. 19, 2018

(65) Prior Publication Data
US 2019/0246252 A1    Aug. 8, 2019

(51) Int. Cl.
*H04W 4/60* (2018.01)
*H04W 36/00* (2009.01)
(Continued)

(52) U.S. Cl.
CPC .......... *H04W 4/60* (2018.02); *H04L 67/1008* (2013.01); *H04L 67/22* (2013.01); *H04W 4/38* (2018.02);
(Continued)

(58) Field of Classification Search
CPC ......... H04W 4/60; H04W 4/38; H04W 36/24; H04W 36/0011; H04W 76/27; H04W 36/14; H04W 36/0016; H04W 36/00; H04W 36/0022; H04W 36/0027; H04W 36/0033; H04W 36/0055; H04W 36/08; H04W 36/18; H04W 36/30; H04W 36/36; H04W 36/38; H04W 52/00; H04W 52/02; H04W 52/0254; H04L 67/22; H04L 67/1008
See application file for complete search history.

(56) References Cited

U.S. PATENT DOCUMENTS 8,526,950 B2 *  9/2013  Jaakkola .............. H04W 48/18
                                                    370/331
2011/0110336 A1  5/2011  Takamura
(Continued)

OTHER PUBLICATIONS

International Search Report and Written Opinion from corresponding International Application No. PCT/EP2016/074713, dated Jun. 19, 2017; 11 pages.
(Continued)

*Primary Examiner* — Nam T Huynh
(74) *Attorney, Agent, or Firm* — Tucker Ellis LLP

(57) ABSTRACT

Based on control data (1002) indicative of a user engagement in a mobile edge application (1001) which is being executed on a source mobile edge server (201-203) of a mobile edge system (200) and on a terminal (130), relocation of the mobile edge application (1001) from the source mobile edge server (201-203) to a target mobile edge server (201-203) is facilitated.

20 Claims, 12 Drawing Sheets

(51) Int. Cl.
*H04W 36/24* (2009.01)
*H04W 4/38* (2018.01)
*H04L 29/08* (2006.01)

(52) U.S. Cl.
CPC ........ *H04W 36/0011* (2013.01); *H04W 36/24* (2013.01)

(56) References Cited

U.S. PATENT DOCUMENTS

2014/0043993 A1* 2/2014 Sirotkin ................ H04L 5/0037
370/252
2019/0028934 A1* 1/2019 Rasanen ........... H04W 36/0027

OTHER PUBLICATIONS

Huawei Technologies France, "MEC016 Application Relocation from the Mobile Edge System" ETSI Draft; MEC(16) 000170, May 7, 2016, 3 pages.
"Mobile Edge Computing (MEC); Framework and Reference Architecture," ETSI GS MEC 003, V1.1.1, Mar. 2016, 18 pages.
"Mobile-Edge Computing (MEC); Technical Requirements," Draft ETSI GS MEC 002, V0.5.1, Feb. 10, 2016, 40 pages.

* cited by examiner

FIG. 10 based on control data indicative of user engagement
in a mobile edge application: facilitating relocation
of the mobile edge application

5011

RELOCATION OF MOBILE EDGE APPLICATIONS

TECHNICAL FIELD

Various examples relate generally to mobile edge computing systems. Various examples relate specifically to relocating mobile edge applications between mobile edge servers. The user engagement in a mobile edge application can be taken into account when facilitating relocation.

BACKGROUND

European Telecommunications Standards Institute (ETSI) industry specification group (ISG) on mobile edge computing (MEC) aims to provide information technology (IT) and cloud-computing capabilities close to the edge of the radio access network (RAN) of a cellular network. Due to the close proximity between MEC hardware such as mobile edge (ME) servers and the user equipment (UE; or terminal), MEC facilitates low latency applications.

MEC is described in Mobile-Edge Computing-Introductory Technical White Paper, September 2014 (Contributors: Huawei, IBM, Intel, Nokia Networks, NTT DOCOMO, Vodafone), which is hereby incorporated herein by reference in its entirety by cross-reference. MEC is further described by ETSI ITS (14)01_038: ISG MEC #1 Minutes of Plenary Meeting, which is also hereby incorporated herein by reference in its entirety.

Reference implementations of MEC systems face certain restrictions and drawbacks. For example, due to the mobility of the terminal, relocation of applications between different ME servers may be required. For example, due to user mobility, the ME system may detect that the current ME server executing the ME application as a host (source ME server) is not optimal and may need to relocate—sometimes also referred to as migrate—the ME application to a new ME server (target ME server). The target ME server may be more appropriate in terms of, e.g., geographical location, load balancing, latency etc. if compared to the source ME server. It has been observed that the relocation of an application from the source ME server to the target ME server can introduce significant latency according to MEC reference implementations.

SUMMARY

Therefore, a need exists for advanced techniques of identifying an optimal time for relocating of an applications in an ME system. In particular, a need exists for techniques of relocating applications in an ME system which overcome or mitigate at least some of the above-identified restrictions and drawbacks.

This need is met by the features of the independent claims. The dependent claims define examples.

According to an example, a method includes facilitating relocation of an ME application from a source ME server to a target ME server. Said facilitating is based on control data indicative of a user engagement in the ME application. The ME application is executed on the source ME server of an ME system and on a terminal.

According to an example, a node of an ME system is configured to facilitate relocation of an ME application from a first ME server of the ME system to a second ME server of the ME system. Said facilitating is based on control data which is indicative of a user engagement in the ME application.

According to an example, a computer program product includes program code that may be executed by at least one processor. Executing the program code can cause the at least one processor to perform a method. The method includes facilitating the location of an ME application from a source ME server to a target ME server. Said facilitating is based on control data indicative of a user engagement in the ME application. The ME application is executed on the source ME server of an ME system and on a terminal.

According to an example, a computer program includes program code that may be executed by at least one processor. Executing the program code can cause the at least one processor to perform a method. The method includes facilitating the location of an ME application from a source ME server to a target ME server. Said facilitating is based on control data indicative of a user engagement in the ME application. The ME application is executed on the source ME server of an ME system and on a terminal.

According to an example, a method includes monitoring sensor data of at least one sensor of a terminal. The method further includes determining control data indicative of the user engagement in the ME application based on said monitoring. The ME application is executed on the terminal and on a source ME server of an ME system. The method further includes transmitting the control data to a node of the ME system for facilitating relocation of the ME application from the source ME server to a target ME server.

According to an example, a computer program product includes program code that may be executed by at least one processor. Executing the program code can cause the at least one processor to perform a method. The method includes monitoring sensor data of at least one sensor of a terminal. The method further includes determining control data indicative of the user engagement in the ME application based on said monitoring. The ME application is executed on the terminal and on a source ME server of an ME system. The method further includes transmitting the control data to a node of the ME system for facilitating relocation of the ME application from the source ME server to a target ME server.

According to an example, a computer program includes program code that may be executed by at least one processor. Executing the program code can cause the at least one processor to perform a method. The method includes monitoring sensor data of at least one sensor of a terminal. The method further includes determining control data indicative of the user engagement in the ME application based on said monitoring. The ME application is executed on the terminal and on a source ME server of an ME system. The method further includes transmitting the control data to a node of the ME system for facilitating relocation of the ME application from the source ME server to a target ME server.

According to an example, a terminal is configured to monitor a user engagement in an ME application of an ME system. The terminal is further configured to determine control data indicative of the user engagement based on said monitoring. The terminal is further configured to transmit the control data to the node of the ME system.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 10 is a flowchart of a method according to various examples.

DETAILED DESCRIPTION OF EXAMPLES

Figure 1:
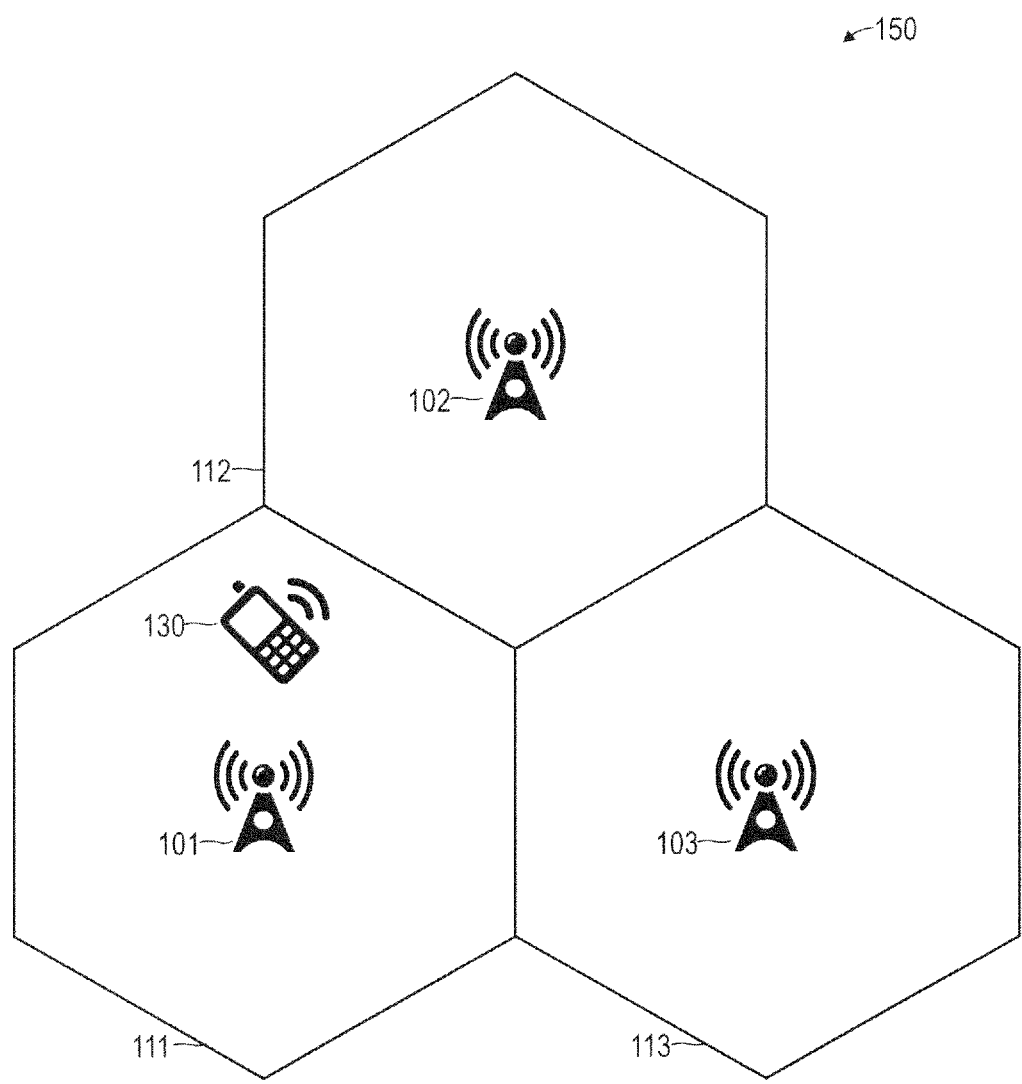
FIG. 1 schematically illustrates a plurality of cells of a radio access network of a cellular network according to various examples.

In the following, examples of the invention will be described in detail with reference to the accompanying drawings. It is to be understood that the following description of examples is not to be taken in a limiting sense. The scope of the invention is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of MEC are described. MEC can facilitate providing ultra-low latency applications to UEs. An ME system providing ME applications is typically associated with radio access nodes such as base stations or access points of a wireless network. An example of a wireless network is a cellular network. For example, ME computing often relies on deployment of ME servers on which an ME application is executed within a radio access network or close to equipment of a radio access network of a cellular network. For example, the ME servers may be co-located with base stations of the radio access network. For example, the ME servers may be operated by the same operator as the radio access network. For example, the ME servers may have a high-throughput backbone connection to the base stations. For example, the ME servers may offer applications such as cloud-based computing. The ME applications offered by the ME servers to a terminal may benefit from low latency. For example, the latency may be less than 30 ms, optionally less than 10 ms. Due to such low latency, latency-sensitive applications may be provided. For example, the ME applications may relate to server-based gaming or augmented reality.

An example use case for an ME system includes Virtual Reality (VR) 3D applications hosted by the ME server; such techniques may enable VR applications also on simpler UEs, such as lower end mobile phones. VR typically requires a very low latency feedback loop between the user input, e.g., moving the head, and the rendered VR 3D frames being shown on the display, e.g., the display in VR glasses. Preferably the total system round trip latency should be less than 10 ms. The ME servers, being placed closer to the users, have the potential to enable low latency applications such as VR.

In some examples, the ME servers together with an ME control node implement an ME system. For example, the ME control node may perform control functionality with respect to the ME servers. Such control functionality may include: facilitating and, in particular, triggering relocation of applications between the ME servers, i.e., from a source ME server to a target ME server; load balancing; deployment of additional ME servers; etc.

According to various examples, relocation of an application from a source ME server to a target ME server is described. Relocation can correspond to moving execution of the ME application from the source ME server to the target ME server during runtime of the ME application. Relocation can correspond to transferring the user context or session instance of the executed application from the source ME server to the target ME server. For example, such relocation of the ME application may be triggered due to various circumstances, including: mobility of the terminal to which the ME application is provided; load balancing between the source ME server and the target ME server; etc.

In one scenario, the user is moving, e.g., walking, moving on a bus, train, or car, and eventually it will be necessary to relocate the ME application. Another scenario in which relocation can be desirable is that the performance of the ME application is better if several users with the same application are grouped into the same ME server: here, it could be beneficial to relocate an ME application to another ME server, because another user has moved and therefore changed ME server. Relocation due to load balancing may also occur to distribute the computational load between a plurality of ME servers. During the relocation, the user experience should be as good as possible even if the relocation will result in rendering glitches, dropped frames, application freeze periods, input lags, etc.

According to various examples, techniques of synchronizing the relocation of the ME application from the source ME server to the target ME server with a point in time of reduced user engagement in the ME application are described. Potentially increased latency when relocating can thus be hidden from the user to some smaller or larger degree. For example, if the user is comparably unaware of the ME application (low engagement), she/he might not notice glitches or delays due to the relocation.

This is achieved by using control data. The control data is indicative of the user engagement in the ME application. Based on the control data it is then possible to facilitate the relocation.

Various techniques described herein are based on the finding that often a time period/window may exist when the relocation from one ME server to another is possible with reduced or minimum impact on end user experience. Depending on the characteristics of the ME application and a number of other aspects, this time window may range from seconds to several hours. From the user's perspective, the experience of the ME application will tend to be better if the relocation is executed while the user has less focus on the ME application.

According to examples, one or more observables can be considered when determining the control data indicative of the user engagement. For example, the computational load may be monitored. A higher (lower) computational load may be indicative of a higher (lower) user engagement. For example, it would be possible to consider runtime parameters of the ME application, at the ME server and/or at the terminal, sometimes also referred to as client. For example, static (changing) runtime parameters can indicative a lower (higher) user engagement. For example CPU load, network load, memory load, fault state of the ME application, etc. can be used to derive a measure of the user focus. Alternatively or additionally, it would also be possible to consider sensor data of at least one sensor of the terminal when determining the control data indicative of the user engagement. Such sensor data may relate to one or more of the following: touch events; eye gaze orientation; an environmental sound; etc. Fusion of such observables and/or other observables may help to accurately quantify the user engagement in the control data.

FIG. 1 illustrates aspects with respect to the cellular network. In particular, FIG. 1 illustrates aspects with respect to a radio access network 150 of the cellular network. In the example of FIG. 1, three base stations 101-103 form the radio access network 150. In other examples, a larger number of base stations could be used. While various examples are described herein in the context of cellular networks, respective techniques may also be applied for other types of networks.

The base station 101 serves a cell 111 of the cellular network. As such, the base station 101 is sometimes referred to as serving base station for UEs 130 located within the cell 111 and connected with the cellular network via the base station 101. The base station 102 serves and adjacent cell 112. Also, the base station 103 serves an adjacent cell 113.

Due to mobility of the terminal 130, the terminal 130 may at one point come close to the cell edge of the cell 111. Typically, in such a cell edge scenario, the quality of communicating on a radio channel between the terminal 130 and the base station 101 deteriorates. For example, at one point the quality of communicating on the radio channel may fall below a certain threshold. This may be due, e.g., the terminal 130 moving away from the base station 101 and towards the base station 102. Then, a handover from the initially serving base station 101—which, in the context of the handover is often referred to as source base station— to the base station 102 (target base station) may occur. Once the handover is completed, the terminal 130 is connected with the cellular network via the base station 102, which is then the new serving base station. Handovers, or generally the mobility of the terminal 130, can be one example why a relocation of the ME application can be required.

Figure 2:
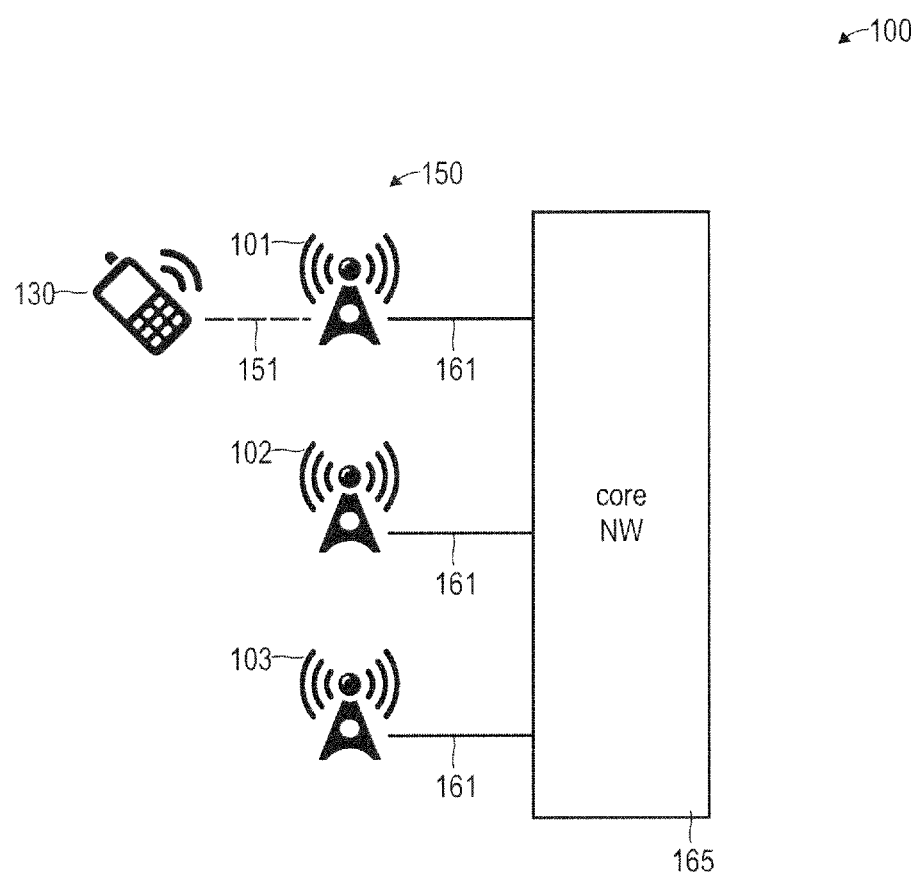
FIG. 2 schematically illustrates the cellular network according to various examples.

FIG. 2 illustrates aspects with respect to the cellular network 100. In FIG. 2, the radio channel 151 via which the terminal 130 is communicating with the base station 101 is illustrated. The communication on the radio channel 151 can be bidirectional including downstream communication from the base station 101 to the terminal 130 and upstream communication from the terminal 130 to the base station 101.

FIG. 2 illustrates a core network 165 of the cellular network 100. The base stations 101-103 are connected by core network interfaces 161 with each other and the core network 165.

For example, the cellular network 100 can be a 3GPP specified cellular network such as 2G, 3G, 4G, or upcoming 5G. For example, in the context of 3GPP 4G Long Term Evolution (LTE) cellular networks 100, the radio access network 150 is sometimes referred to as evolved Universal Mobile Telecommunications System Terrestrial Radio Access (E-UTRAN). Further examples include a 3GPP Narrowband Internet of Things (NB-IoT) or Machine Type Communication network. The techniques described herein with respect to ME computing are not limited to cellular networks. Techniques of ME computing is described herein may be readily applied to other kinds and types of networks. Other examples include Institute of Electrical and Electronics Engineers (IEEE)—specified networks, e.g., according to the 802.11x Wi-Fi protocol or the Bluetooth protocol.

Figure 3:
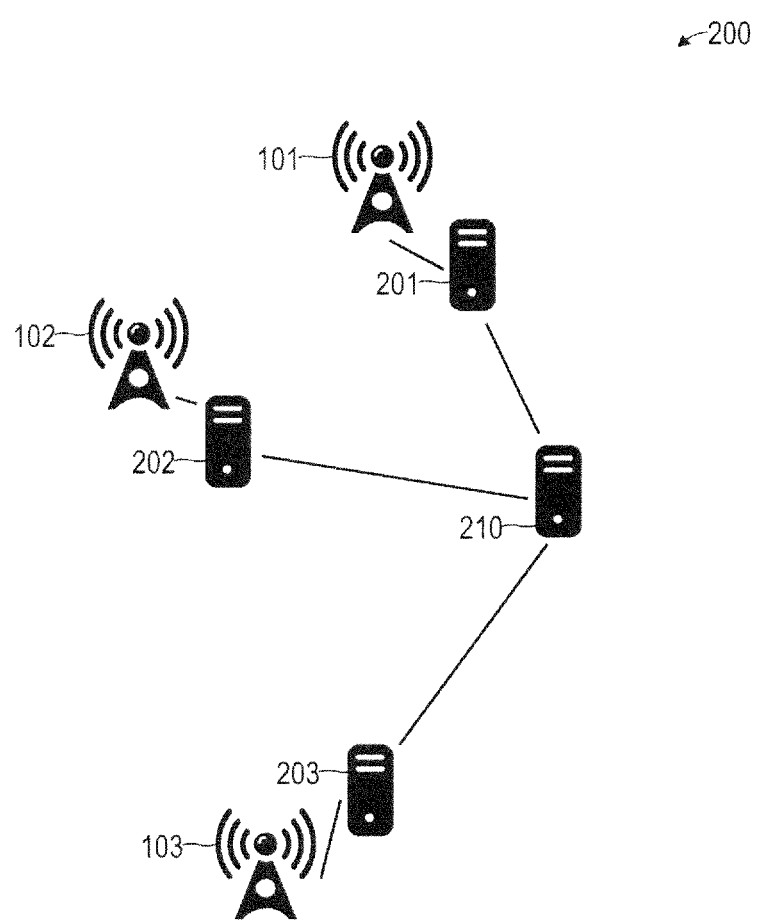
FIG. 3 schematically illustrates an ME system comprising ME servers associated with base stations of the radio access network and an ME control node according to various examples.

FIG. 3 illustrates aspects with respect to an ME system 200. The ME system 200 is associated with the RAN 150 of the network 100. The ME system 200 includes ME servers 201-203. The ME server 201 is associated with the base station 101; the ME server 202 is associated with the base station 102; and the ME server 203 is associated with the base station 103. Applications hosted by a given one of the terminal servers 201-203 are typically provided to UEs connected to the respectively associated base station 101-103.

While in the example of FIG. 3 there is a one-to-one correspondence between ME servers 201-203 and base stations 101-103, in other examples, it is also possible that more than a single base station 101-103 is associated with a given ME server 201-203.

For example, the ME servers 201-203 could be co-located at the same site as the associated base station 101-103. By deploying the ME servers 201-203 in or close to the radio access network 150, a comparably low latency for communicating between the ME servers 201-203 and the associated base stations 101-103 may be achieved. For example, the latency of communicating between a given ME server 201-203 and the associated base station 101-103 may be below 30 milliseconds, preferably below 10 microseconds, more preferably below 1 microsecond. Sometimes, such a dimension of the latency is also referred to as ultra-low latency.

Control of the ME system 200 is provided by an ME control node 210. In the example of FIG. 3, the ME controller 210 is a dedicated entity. However, in other examples, it would also be possible that the ME control node 210 is co-located with one or more of the ME servers 201-203. For example, the ME control node 210 can perform tasks of load balancing between the various ME servers 201-203. For example, the ME control node 210 can keep track of a computational load imposed to the various ME servers 201-203.

For example, the ME control node 210 can perform tasks with respect to relocating an application from a source ME server 201-203 to a target ME server 201-203. For example, relocation of the ME application may be triggered due to mobility of the terminal to which the ME application is provided. For example, relocation of the ME application may be due to a handover between cells 111-113 of the radio access network 150 of the cellular network 100. For example, relocation of the ME application may be triggered due to load balancing.

Figure 4:
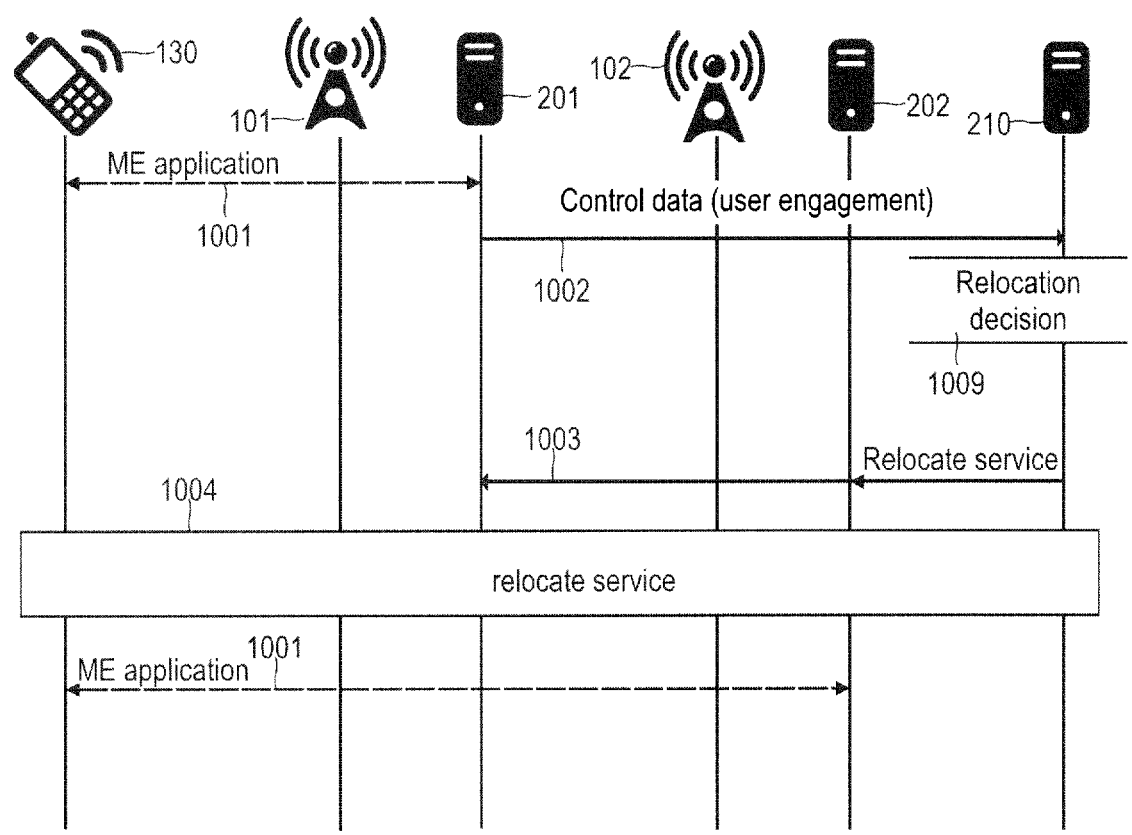
FIG. 4 is a signaling diagram schematically illustrating facilitating of relocation of an ME application from a source ME server to a target ME server.

FIG. 4 illustrates aspects with respect to a relocating an ME application 1001 from a source ME server 201 to a target ME server 202. The ME application 1001 is initially executed by the terminal 130 and the ME server 201. The ME application 1001 may include communication of payload data between the terminal 130 and the ME server 201 (indicated by the dashed line in FIG. 4). Sometimes, the ME server 201 is said to host the ME application 201. The terminal 130 may provide a user interface such as a graphical user interface (GUI) of the ME application 1001. Payload data of the ME application 1001 is communicated between the terminal 130 and the ME server 201 via the base station 101. For example, it would be possible that the ME server 201 is located close to the base station 101 in order to provide the ME application 1001 with low latency.

The ME server 201 eventually sends control data 1002 implementing a relocation hint to the ME control node 210. The control data 1002 is indicative of a user engagement in the ME application 1001. The ME control node 210 can take into account the control data 1002 when taking a decision on whether to relocate the ME application 1001 from the ME server 201 to the ME server 202, block 1009. For example, the ME control node 210 may perform a threshold comparison between the user engagement indicated by the control data 1002 and a predefined threshold when taking the decision on whether to relocate the ME application 1001 at block 1009. By using the control data 1002 which is indicative of the user engagement in the ME application 1001, it becomes possible to trigger the relocation at a point in time at which the user engagement is particularly low. Thereby, the user experience may not be severely affected by potential latency due to the relocation.

It is possible that the ME control node 210 takes into account additional decision criteria beyond the user engagement of the control data when taking the decision on whether to relocate the ME application 1001 from the ME server 201 to the ME server 202. For example, such additional decision criteria can correspond to a handover of the terminal 130 from the base station 101 to the base station 102; load balancing between the ME servers 201, 202; etc. Eventually, the ME control node 210 takes the decision to relocate the ME application 1001. Then, the ME control node 210 transmits a command message 1003 which triggers the relocation of the ME application 1001. In the example of FIG. 4, the command message 1003 is transmitted to, both, the ME server 201, as well as the ME server 202. It would also be possible that the command message 1003 is transmitted to either the ME server 201, or the ME server 202. Alternatively or additionally, it would also be possible to inform the terminal 130 accordingly by transmitting the command message 1003 also to the terminal 130.

Then, the relocation 1004 is executed. Afterwards, the ME application 1001 is executed by the terminal 130 and the target ME server 202. Respective control signaling is implemented via the base station 102. Resources previously allocated for the execution of the ME application at the ME server 201 can be released.

Generally, the control data 1002 indicative of the user engagement may be determined by the terminal 130. Alternatively or additionally, the control data 1002 indicative of the user engagement may be determined by the ME server 201. It would also be possible that the control data 1002 indicative of the user engagement is partly determined by the terminal 130, and partly determined by the ME server 201. As such, a distribution of logic for monitoring the user engagement between the terminal 130 and the ME server 201 is conceivable. If the control data 1002 is at least partly determined that the terminal 130, it is possible that the terminal 130 then transmits the control data to the ME server 201 and/or to the ME control node 210 directly (not illustrated in FIG. 4). A cascaded transmission from the terminal 130 to the ME control node 210 via one or more intermediate ME servers 201-203 is possible.

In particular in scenarios in which the control data indicative of the user engagement is at least partly determined by the ME server 201, in some examples this may involve monitoring a computational load of executing the ME application and determining the control data 1002 based on said monitoring. For example, the computational load may include one or more of the following: data traffic to and from the terminal 130 associated with the ME application 1001; processing operations associated with the ME application 1001 at the processing unit of the ME server 201; amount of data associated with the ME application 1001 in the memory of the ME server 201; etc. It has been observed that a higher (lower) computational load often correlates with the user engagement in the ME application. For example, if the user is comparably inactive and only places little or no user focus on the ME application, various runtime parameters of the ME application 1001 can remain comparably static. Then, for example, the amount of data associated with the ME application 1001 in the memory of the ME server 201 can also show only a small time dependency. There may be only few processing operations required for executing the ME application at the ME server 201 in such a scenario. Thus, by monitoring the computational load it may be possible to draw conclusions on the user engagement in the ME application 1001. Such techniques may be alternatively or additionally implemented at the terminal 130. For example, the terminal may monitor the computational load of executing the ME application and determining the control data 1002 based on said monitoring.

A further example of an observable which may be indicative of the user engagement in the ME application 1001 are the runtime parameters of the ME application 1001 during execution. Here, the runtime parameters may be monitored at the terminal 130 and/or at the ME server 201. For example, a change in the runtime parameters can be indicative of a comparably large user engagement in the ME application 1001; while runtime parameters that remain comparably static can be indicative of a comparably small user engagement in the ME application 1001. Example runtime parameters include: size of variables associated with the execution of the ME application 1001; content of variables associated with the execution of the ME application 1001; etc.

As will be appreciated from the above, by considering properties of the execution of the ME application 1001, it is possible to draw some conclusions on the user engagement in the ME application 1001. In some examples, it is also possible to obtain a more direct measure of the user engagement, e.g., by relying on sensor data of at least one sensor of the terminal 130.

Figure 5:
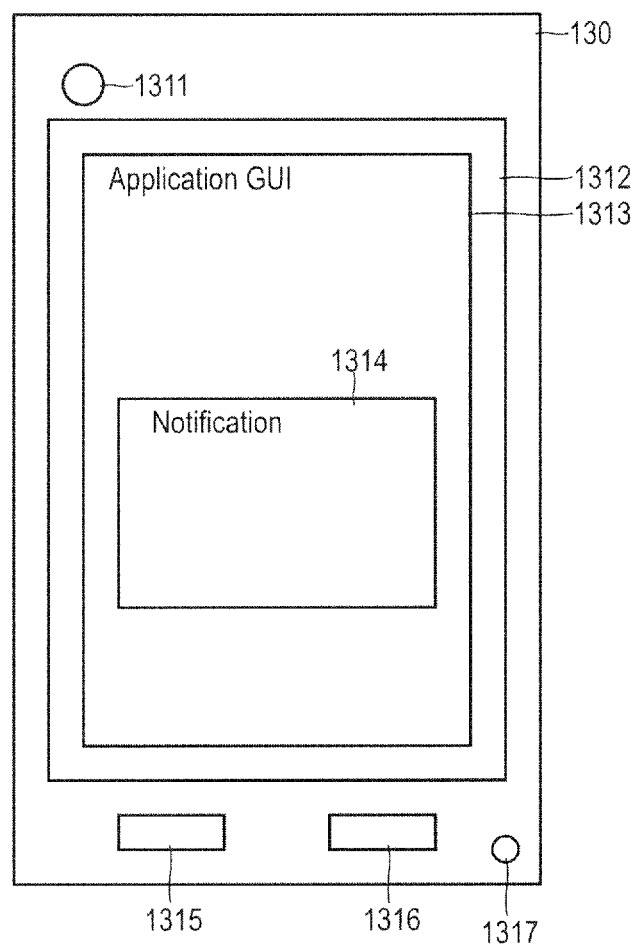
FIG. 5 schematically illustrates a terminal connectable to the cellular network according to various examples.

FIG. 5 schematically illustrates aspects with respect to the terminal 130. In particular, FIG. 5 illustrates aspects with respect to sensors of the terminal 130. In the example of FIG. 5, the terminal 130 is a handheld mobile phone. However, in other examples, the terminal 130 may be implemented by other kinds and types of devices, including: VR gear; laptops; desktop PCs; tablets; set-top boxes; gaming consoles; smart televisions; etc.

The terminal 130 includes a face camera 1311; a touch sensitive display 1312; a microphone 1317; and buttons 1315, 1316. A GUI 1313 of the ME application 1001 is implemented on the display 1312. In the state of the GUI 1313 exemplarily depicted in FIG. 5, a notification pop-up message 1314 is being displayed; this pop-up message 1314 may be of an application different from the ME application 1001.

Based on sensor data of the sensors 1311, 1312, 1315-1317 it is possible to obtain an accurate measure of the user engagement in the ME application 1001. Here, it is generally possible to consider sensor data of a single one of the sensors 1311, 1312, 1315-1317 and/or to perform sensor fusion for the sensor data of a plurality of the sensors 1311, 1312, 1315-1317. The terminal 130 can be configured to monitor the sensor data and determine the control data 1002 based on said monitoring.

For example, it would be possible to monitor the touch events on the touch-sensitive display 1312 and/or the buttons 1315, 1316. Then, the user engagement may relate to the touch events with respect to the GUI 1313. For example, if a large count of touch events relevant with respect to the GUI 1313 of the ME application 1001 is detected in a given time interval, this may be indicative of a high user engagement in the ME application 1001. On the other hand, if no or only a small number of touch events are detected, this may be indicative of a low user engagement in the ME application 1001. For example, if the count of touch events, either in total over the entire lifetime of the ME application 1001 or over a fixed time period—e.g., defined by a sliding window—is high, the user is likely to be fully involved in the ME application. Differently, the count of touch events is low, a high user engagement is less probable.

For example, it would be possible to monitor the eye gaze orientation using the face camera 1311 of the terminal 130. Then, the user engagement may relate to the eye gaze orientation with respect to the GUI 1313. For example, if it is detected that the user is actually looking at the GUI 1313 of the ME application 1001, e.g., by tracking the gaze of the user, or rather looking at some notification overlay such as the pop-up notification 1314, different measures of the user engagement can be deduced. For example, if it is detected that the user has an eye gaze oriented outside of the display 1312, a particularly low user engagement can be deduced. For example, it may be possible to perform averaging over a certain time period, e.g., using a sliding-window technique. For example if the user oriented the eye gaze towards the GUI 1313 of the ME application 1001 80% of the time during the last 3 seconds, a comparably high user engagement can be deduced.

For example, it would be possible to monitor notifications from other applications that are also executed by a processor of the terminal 130, but different to the ME application 1001 subject to potential relocation. An example is the pop-up notification 1314 which could correspond to a messenger not if the case and indicating an incoming new message. For example, if such a pop-up notification 1314 is detected, it is likely that the user engagement in the ME application 1001 is limited. Generally, it may be possible to monitor a window focus of the operating system of the terminal 130 with respect to the GUI 1313 of the ME application 1001. For example, in the state illustrated in FIG. 5, the window focus of the operating system may be associated with the pop-up notification 1314—and not with the GUI 1313 of the ME application 1001. This may correspond to a high likelihood for a low user engagement in the ME application 1001.

For example, it would be possible that the sensor data of the microphone 1317 is monitored. Then, the user engagement may relate to an environmental sound detected by the microphone 1317 of the terminal. For example, it would be possible to detect if a third party person is located in the same room as the user of the terminal 130 and is talking to the user of the terminal 130. If this is the case, it is likely that the user directs her/his attention towards this conversation. Then, the user engagement in the ME application 1001 is likely to be low. It could be possible to employ a threshold comparison between a level of the environmental sound indicated by the sensor data of the microphone 1317 and a predefined threshold. For example, if the environmental sound level exceeds the predefined threshold, it could be possible to assume limited user engagement in the ME application 1001.

In further examples, it would also be possible to make advanced analysis with respect to the environmental sound. For example, the environmental sound may be analyzed to detect speech. Thus, background noise different to speech may be filtered. For example, a high pass filter and/or band pass filter and/or low pass filter may be applied. For example, machine-originating noise may be filtered. For example, it may be possible to employ voice recognition on the environmental sound. For example, it may be possible to detect the originator of the environmental sound. For example, it can be checked whether the user of the terminal 130 is the originator of the environmental sound. For example, it may be detected whether the user of the terminal 130 is engaged in a conversation.

For example, it would be possible to monitor different input means of the user interface of the ME application 1001 implemented at the terminal 130. For example, the user interface may include the GUI 1013 and may alternatively or additionally include other input means such as touch actions, force actions such as shaking the terminal 130, voice commands, etc. Then, the user engagement may generally relate to user commands input via the user interface of the ME application 1001.

The control data 1002 indicative of the user engagement can include a different information depth in different examples. For example, it would be possible that the control data 1002 is indicative of the raw sensor data, which is monitored by the terminal 130. In further examples, it would be possible that the control data 1002 does not include the raw sensor data, but rather a derived value. The control data may be indicative of an aggregated user focus on the terminal-site user interface of the ME application 1001. For example, the control data 1002 may include a single metric, e.g., a scalar value or a binary value. For example, the scalar value may define the user engagement between a minimum value and a maximum value. The binary value could take the value Zero for low user engagement and could take the value One for high user engagement. The control data 1002 may also include more than a single metric. The different metrics may be defined with respect to different observables that can be indicative of the user engagement, e.g., different sensor data and/or the computational load or runtime parameters. Here, it is not mandatory that the raw sensor data is included in the control data; nonetheless, a high information depth can be provided then if the aggregated user focus is included in the control data in a single metric.

Generally, it is possible that the control data is indicative of the user engagement in the time-resolved manner. This can enable to accurately time the relocation. For this, it may be possible that the control data includes timing information, which specifies the point in time associated with the user engagement indicated by the control data. For example, the timing information could relate to time stamps. For example, based on such a time-resolved user engagement, it can be possible to derive changes in time of the user engagement and make a prediction of the expected user engagement in the near future. This can help to accurately synchronize the relocation with a point in time at which low user engagement is likely to be observed. Processing delays can be compensated. In some examples, it is even possible that the control data itself is indicative of a prospective user engagement. The control data may include a validity duration. The validity duration may correspond to a time duration during which the user engagement indicated by the control data is assumed to remain essentially static. For example, the control data 1002 could be indicative of a (future) point in time of reduced user engagement. Then, the ME control node 210 could trigger the relocation synchronized with this point in time, e.g., by transmitting the command message 1003 accordingly and/or by including respective timing information in the command message 1003.

Figure 6:
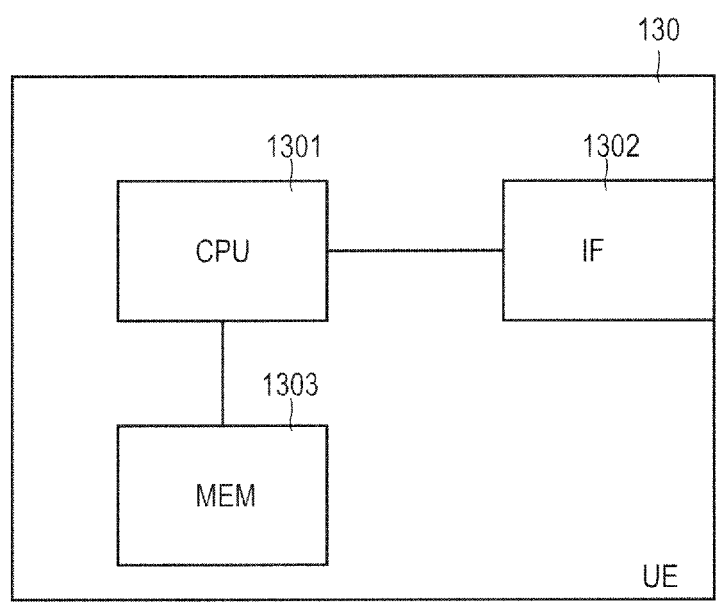
FIG. 6 schematically illustrates a terminal connectable to the cellular network according to various examples.

FIG. 6 illustrates aspects with respect to the terminal 130. The terminal 130 includes a processor 1301, e.g., a multi-core processor. The terminal 130 further includes an interface 1302. The processor 1301 can communicate via the interface 1302, e.g., with entities of the end the ME system 260 and/or on the radio channel 151 of the respective radio access network 150 with the base station. Further, the terminal 130 includes a memory, e.g., a non-volatile memory 1303. It is possible that control instructions are stored on the memory 1303. The control instructions can be executed by the processor 1301. Executing the control instructions can cause the processor 1301 to perform various techniques described herein, e.g., related to executing an ME application, relocating an ME application from a source ME server to a target ME server, monitoring sensor data of at least one sensor of the terminal 130 (in FIG. 6, the at least one sensor is not illustrated), determining control data indicative of the user engagement in the ME application based on the sensor data, etc.

Figure 7:
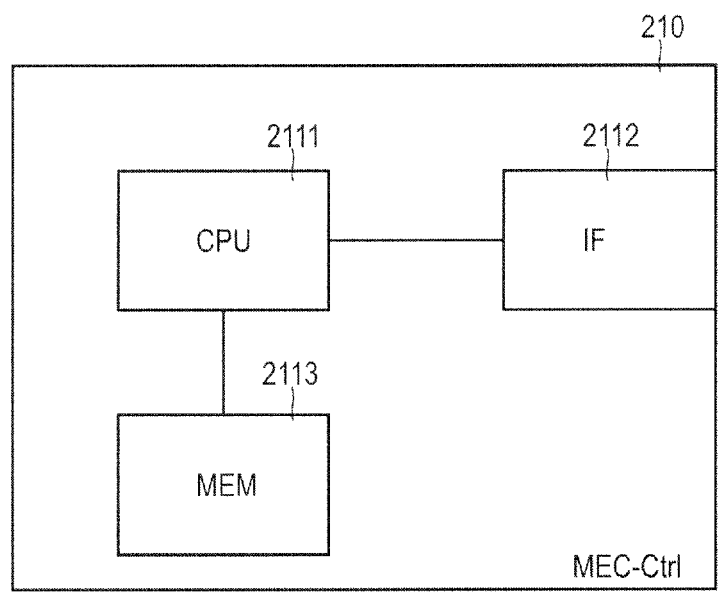
FIG. 7 schematically illustrates an ME control node of an ME system according to various examples.

FIG. 7 illustrates aspects with respect to the ME control node 210. The ME control node 210 includes a processor 2111, e.g., a multi-core processor. The ME control node 210 further includes an interface 2112. The processor 2111 can communicate via the interface 2112, e.g., with entities of the ME system 200 and/or the base stations 101-103 of the radio access network 150 of the cellular network 100. Further, the ME control node 210 includes a memory 2113, e.g., a non-volatile memory. It is possible that control instructions are stored by the memory 2113. The control instructions can be executed by the processor 2111. Executing the control instructions can cause the processor 2111 to perform various techniques as described herein, e.g., related to triggering relocation of an ME application from a source ME server to a target ME server.

Figure 8:
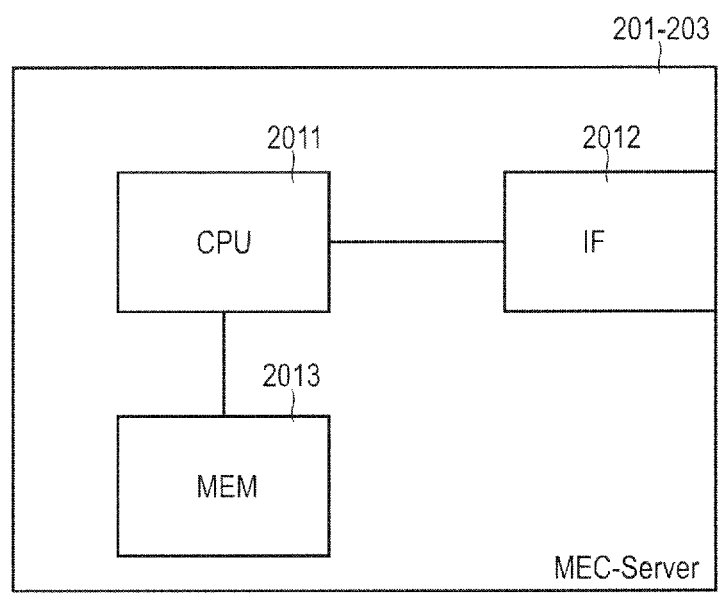
FIG. 8 schematically illustrates an ME server according to various examples.

FIG. 8 illustrates aspects with respect to the ME servers 201-203. The ME servers 201-203 include a processor 2011, e.g., a multi-core processor. The ME servers 201-203 further include an interface 2012. The processor 2011 can communicate via the interface 2012, e.g., with further entities of the ME system 200 and/or the base stations 101-103 of the radio access network 150 of the cellular network 100. Further, the ME servers 201-203 include a memory 2013, e.g., a non-volatile memory. It is possible that control instructions are stored by the memory 2013. The control instructions can be executed by the processor 2011. Executing the control instructions can cause the processor 2011 to perform various techniques as described herein, e.g., related to relocating an application from a source ME server to a target ME server and executing an ME.

Figure 9:
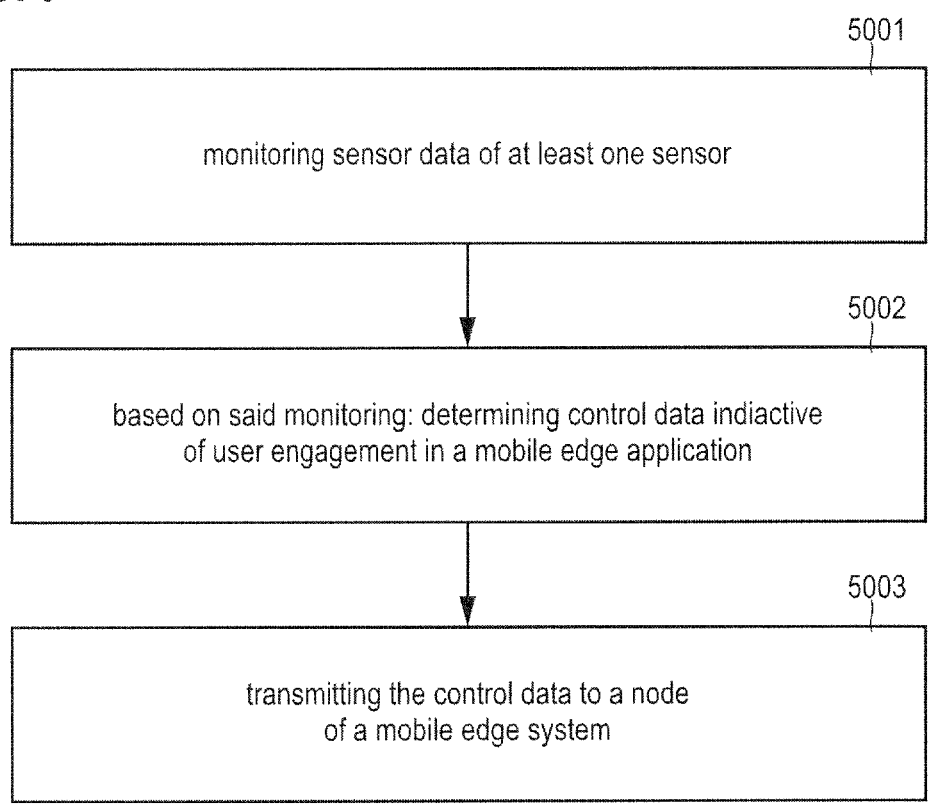
FIG. 9 is a flowchart of a method according to various examples.

FIG. 9 is a flowchart of a method according to various examples. For example, the method according to FIG. 9 may be executed by the processor 1301 of the terminal 130.

In block 5001, sensor data of at least one sensor of the terminal is monitored. This may involve repeatedly receiving the sensor data. This may involve analyzing changes in the sensor data. For example, a sliding window technique may be employed: based on a window of given duration, averaging of values of the sensor data can be performed. Typical durations of the window can be in the range of 0.5 seconds-10 seconds.

In block 5002, control data is determined based on the monitoring of block 5001. The control data is indicative of the user engagement in the ME application executed by the terminal. For example, block 5012 may involve post-processing of the sensor data of block 5001. An aggregated measure of the user focus on a user interface of the ME application may be determined from the sensor data. Then, the amount of data to be included in the control data can be significantly reduced if compared to the size of the sensor data. For example, the control data can include a single bit value or multibit value, which quantifies the user engagement in a predefined metric. In other examples, it would also be possible to include the raw sensor data to some larger or smaller degree in the control data.

In block 5003, the control data is transmitted to a node of an ME system. For example, the control data can be transmitted via a wireless link established by a radio access network of a cellular network, wherein the ME system is associated with the radio access network. For example, the control data could be transmitted to one or more ME servers and/or to an ME control node.

FIG. 10 is a flowchart of a method according to various examples. For example, the method according to FIG. 10 may be executed by the processor 2111 of the ME control node 210 and/or by the processor 2011 of the ME server 201-203.

In block 5011, relocation of an ME application of the ME system is facilitated. For this, control data indicative of the user engagement is taken into account. For example, the control data may be obtained by the method according to the example of FIG. 9. Alternatively or additionally, the control data may be determined prior to block 5011. This may involve, e.g., monitoring a computational load of executing the ME application, e.g., at the ME server 201-203. For example, such information derived from the computational load may be combined with further control data received from the terminal which also executes the ME application and, e.g., provides the control data according to the method of the example of FIG. 9.

Facilitating the relocation of the ME application in block 5011 can take various forms. For example, facilitating the relocation in block 5011 may involve transmitting the control data to the ME control node 210. For example, facilitating the relocation in block 5011 may involve transmitting a command message triggering the relocation to one or more ME servers 201-203 and/or to the terminal 130. Here, timing information could be included to synchronize the relocation with a particular point in time of reduced user engagement.

Figure 11:
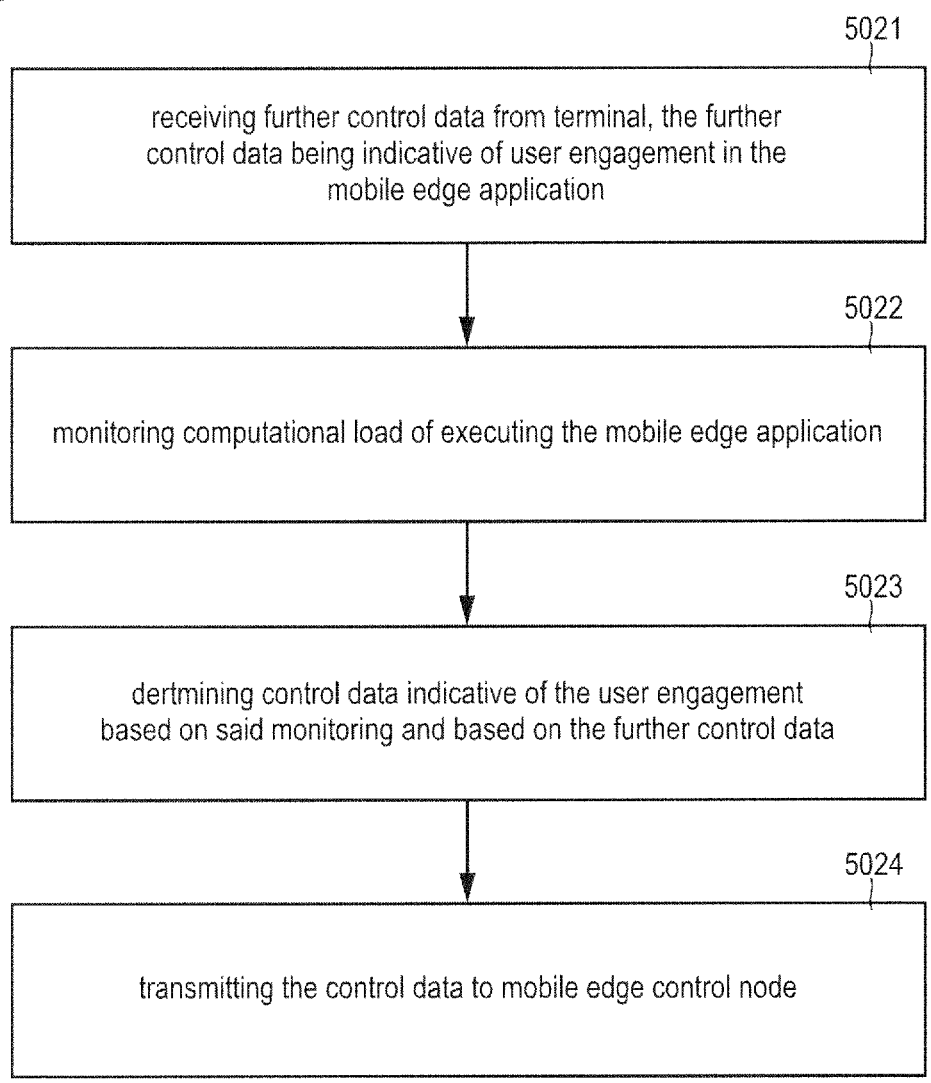
FIG. 11 is a flowchart of a method according to various examples.

FIG. 11 is a flowchart of a method according to various examples. For example, the method according to FIG. 11 may be executed by the processor 2011 of the ME server 201-203. In block 5021, further control data is received from a terminal. The terminal also executes the ME application. The further control data is indicative of the user engagement at the ME application. For example, the further control data received in block 5021 may be determined according to a method of the example of FIG. 9.

Next, the computational load of executing the ME application is monitored, block 5022. Thereby, an additional measure of the user engagement is obtained. Thus, in block 5023, control data indicative of the user engagement can be determined based on, both, the computational load derived from block 5022 the further control data received in block 5021. This may correspond to fusion of multiple sources providing observables indicative of the user engagement. A more accurate measure of the user engagement can be derived.

Finally, in block 5024, the control data is transmitted to the ME control node. This facilitates relocation of the ME application by providing the control data as a relocation hint. While the final decision on whether the relocation should be executed remains with the ME control node, the control data can add to the decision basis.

Figure 12:
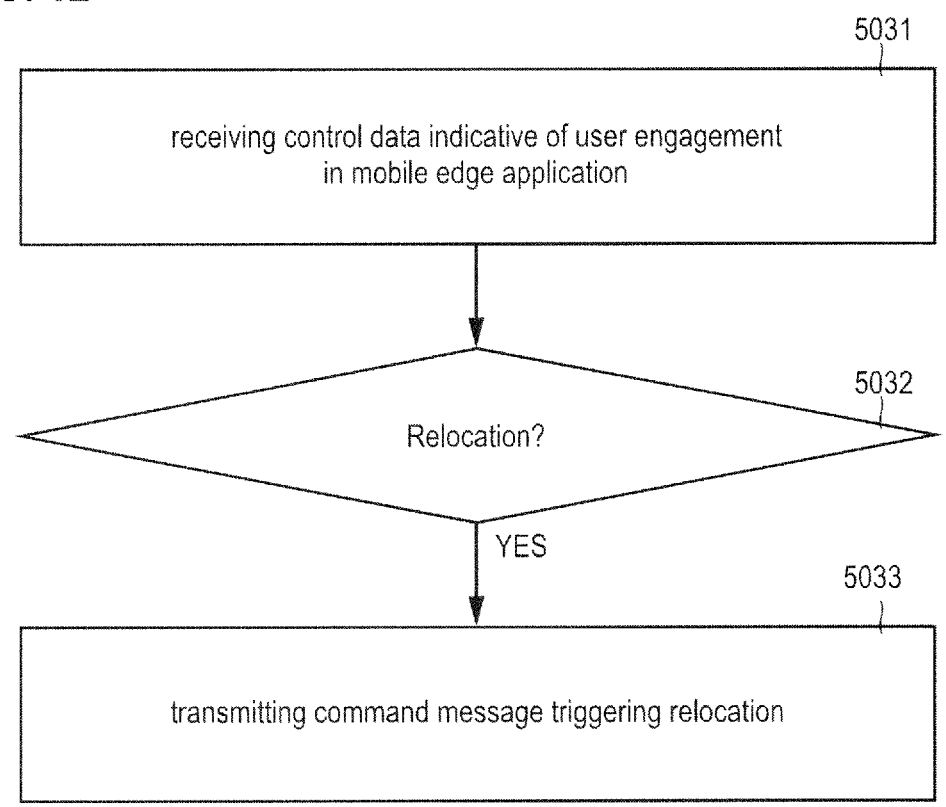
FIG. 12 is a flowchart of a method according to various examples.

FIG. 12 is a flowchart of a method according to various examples. For example, the method according to FIG. 12 may be executed by the processor 2111 of the ME control node 210.

In block 5031, control data indicative of the user engagement is received. For example, the control data of block 5031 may be obtained by the method according to the example of FIG. 11 and/or by the method according to the example of FIG. 9. As such, the control data received at block 5031 may be determined based on logic residing at the ME server 201-203 currently executing the ME application and/or based on logic residing at the terminal 130 currently executing the ME application.

Next, block 5032, a decision on whether to trigger the relocation can be taken. In block 5032, the control data received in block 5031 can be taken into account. Optionally, further decision criteria can be considered.

If relocation is to be performed, a corresponding command message can be transmitted in block 5033. The command message triggers the relocation. As such, block 5033 also facilitates the relocation.

Summarizing, above, techniques have been described which enable to consider user behavior when deciding on a relocation of an ME server. This enables to optimize and improve the user experience during the relocation. An example would be to gauge the degree user engagement in the ME application. Here, various observables can be considered, including, but not limited to: the amount of touch events associated with a GUI of the ME application at the terminal; and eye gaze orientation with respect to the GUI of the ME application at the terminal; an environmental sound at the terminal; a window focus of an operating system of the terminal with respect to the GUI of the ME application; etc. it would also be possible to consider a computational load of executing the ME application at the terminal and/or the source ME server. Also, runtime parameters of the ME application while being executed can be considered.

Furthermore, above techniques have been described which enable to implement a signaling scheme between the terminal, the ME servers, and the ME control node. Such a signaling scheme includes the signaling of control data, which is indicative of the user engagement. Thereby, reports of the user engagement can be considered by the ME control node when taking the decision on relocation. As such, the control data can implement a relocation hint/relocation recommendation. For example, such control data can be sent from the terminal to the ME server and then cascaded to the ME control node. Here, it is possible that the ME server modifies the control data and adds additional information on the user engagement, e.g., by techniques of fusing different observables. For example, a terminal-side metric and a server-side metric can be fused into a single metric. It would also be possible that different metrics are included for, both, the terminal and the ME server.

Although the invention has been shown and described with respect to certain preferred examples, equivalents and modifications will occur to others skilled in the art upon the reading and understanding of the specification. The present invention includes all such equivalents and modifications and is limited only by the scope of the appended claims.

For example, while in some examples the ME control node is shown as a separate entity, in other examples the ME control node may be implemented at an ME server.

For example, while above various techniques have been described in the context of cellular networks, it should be understood that generally the techniques may be readily applied to other kinds and types of networks. Examples include the 802.11x Wi-Fi protocol.

The invention claimed is:

1. A method, comprising:
   receiving control data from an associated terminal, the control data being indicative of a reduced user engagement in a mobile edge application that is being executed on a source mobile edge server of a mobile edge system and on the associated terminal; and
   facilitating relocation of the mobile edge application from the source mobile edge server to a target mobile edge server based on the control data.

2. The method of claim 1, further comprising:
   monitoring a computational load of executing the mobile edge application, and based on said monitoring:
   determining the control data.

3. The method of claim 2, further comprising:
   receiving further control data from the associated terminal, the further control data being indicative of the reduced user engagement in the mobile edge application, wherein the control data is determined based on fusion with the further control data.

4. The method of claim 1, further comprising:
   based on a threshold comparison of the reduced user engagement and a predefined threshold:
   selectively transmitting a command message which triggers the relocation of the mobile edge application.

5. The method of claim 4, wherein the control data is indicative of a point in time of the reduced user engagement, wherein the relocation is triggered synchronized with the point in time.

6. A method, comprising:
   determining control data based on monitored sensor data of at least one sensor monitored by an associated terminal, the control data being indicative of a user engagement in a mobile edge application that is being executed on the associated terminal and on a source mobile edge server of a mobile edge system; and
   transmitting the control data to a node of the mobile edge system for facilitating relocation of the mobile edge application from the source mobile edge server to a target mobile edge server based on the control data.

7. The method of claim 6, wherein the reduced user engagement relates to touch events with respect to a terminal-side user interface of the mobile edge application.

8. The method of claim 6 wherein the reduced user engagement relates to an eye gaze orientation with respect to a terminal-side user interface of the mobile edge application.

9. The method of claim 6, wherein the reduced user engagement relates to a window focus of an operating system of the associated terminal with respect to a terminal-side user interface of the mobile edge application.

10. The method of claim 6, wherein the reduced user engagement relates to an environmental sound detected by a microphone of the associated terminal.

11. The method of claim 6, wherein the reduced user engagement relates to a user command input via a terminal-side user interface of the mobile edge application.

12. The method of claim 6, wherein the reduced user engagement relates to runtime parameters of the mobile edge application.

13. The method of claim 6, wherein the control data is indicative of an aggregated user focus on a terminal-side user interface of the mobile edge application.

14. The method of claim 6, wherein the control data is indicative of a prospective user engagement during a validity duration.

15. The method of claim 6, wherein the control data is indicative of the reduced user engagement in a time-resolved manner.

16. The method of claim 6, wherein the mobile edge system is associated with a radio access network of a cellular network to which the associated terminal is connected.

17. The method of claim 6, wherein the mobile edge application has a latency of not more than 30 ms, optionally of not more than 10 ms.

18. A node of a mobile edge system, the node being configured to facilitate relocation of a mobile edge application that is being executed on a first mobile edge server of the mobile edge system and on an associated terminal from the first mobile edge server of the mobile edge system to a second mobile edge server of the mobile edge system based on control data received from the associated terminal, the control data being indicative of a reduced user engagement in the mobile edge application.

19. A terminal, configured to:
monitor user engagement in a mobile edge application of a mobile edge system that is being executed on a first mobile edge server of the mobile edge system and on the terminal and, based on said monitoring:
  determine control data indicative of a reduced user engagement in the mobile edge application, and
  transmit the control data to a node of the mobile edge system,
  wherein the transmitted control data facilitates relocation of the mobile edge application from the first mobile edge server of the mobile edge system to a second mobile edge server of the mobile edge system.

20. A system, comprising:
a node; and
a terminal,
wherein the node is configured to facilitate relocation of a mobile edge application that is being executed on a first mobile edge server of a mobile edge system and on the terminal from the first mobile edge server of the mobile edge system to a second mobile edge server of the mobile edge system based on control data received from the terminal, the control data being indicative of a reduced user engagement in the mobile edge application that is being executed on the first mobile edge server of the mobile edge system and on the terminal,
wherein the terminal is configured to monitor user engagement in the mobile edge application of the mobile edge system and, based on said monitoring:
  determine the control data indicative of the reduced user engagement; and
  transmit the control data to the node of the mobile edge system.

* * * * *